United States Patent
Wang

(10) Patent No.: US 10,583,467 B2
(45) Date of Patent: Mar. 10, 2020

(54) MEDICINE POWDER CLEANING APPARATUS AND MEDICINE POWDER CLEANING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Yu-Ting Wang, New Taipei (TW)

(73) Assignees: HONG FU JIN PRECISION INDUSTRY (Shenzhen) CO., LTD., Shenzhen (CN); HONG HAI PRECISION INDUSTRY CO., LTD., New Taipei (CN)

( * ) Notice: Subject to any disclaimer, the term of this patent is extended or adjusted under 35 U.S.C. 154(b) by 496 days.

(21) Appl. No.: 15/286,507

(22) Filed: Oct. 5, 2016

(65) Prior Publication Data

US 2018/0071796 A1 Mar. 15, 2018

(30) Foreign Application Priority Data

Sep. 9, 2016 (CN) .......................... 2016 1 0811377

(51) Int. Cl.
*B08B 5/02* (2006.01)
*B08B 9/032* (2006.01)
*B08B 5/04* (2006.01)
*G05D 16/20* (2006.01)

(52) U.S. Cl.
CPC ............... *B08B 5/02* (2013.01); *B08B 5/04* (2013.01); *B08B 9/0328* (2013.01); *G05D 16/208* (2013.01); *G05D 16/2013* (2013.01); *G05D 16/2066* (2013.01)

(58) Field of Classification Search
CPC ........... B08B 5/02; B08B 5/04; B08B 9/0328; B08B 9/0325; G05D 16/2013; G05D 16/2066; G05D 16/208
See application file for complete search history.

(56) References Cited

U.S. PATENT DOCUMENTS

2013/0088716 A1 * 4/2013 Romanin ................ G01F 1/661
356/442

FOREIGN PATENT DOCUMENTS

CN 104043168 A * 9/2014

OTHER PUBLICATIONS

Machine Translation of CN 104043168 A (Year: 2019).*

* cited by examiner

*Primary Examiner* — Laura C Guidotti
(74) *Attorney, Agent, or Firm* — ScienBiziP, P.C.

(57) ABSTRACT

A medicine powder cleaning apparatus includes a pressure sensor, a positive pump, and a control module. The control module includes control unit and power supply unit. The pressure sensor detects a first pressing force to obtain a first detection value. The pressure sensor detects a first pressing force in a first tube to obtain a first detection value. The control unit is configured to obtain the first difference value, and determine whether within a reference range. The power supply unit supplies power to the positive pump when the first difference value is not within the reference range. The positive pump is configured to blow out the medicine powder in the first tube after being supplied with power by the power supply unit. A medicine powder cleaning method is also provided.

6 Claims, 5 Drawing Sheets

501 — The negative pump is turned off, the control unit controls the positive pump and the solenoid valve to turn on 502 — The solenoid valve controls the airflow in the second tube to flow 503 — The positive pump creates the airflow to blow the medicine powder out to the outputting device from the opening of the first tube

FIG. 5

MEDICINE POWDER CLEANING APPARATUS AND MEDICINE POWDER CLEANING METHOD

FIELD

The subject matter herein generally relates to a cleaning apparatus for cleaning medicine powder.

BACKGROUND

A medicine powder cleaning apparatus is used to clean medicine powder and unblock compacted medicine powder.

BRIEF DESCRIPTION OF THE DRAWINGS

Implementations of the present technology will now be described, by way of example only, with reference to the attached figures.

FIG. 5 is a flowchart of a cleaning block of the medicine powder cleaning method of FIG. 3.

DETAILED DESCRIPTION

Figure 1:
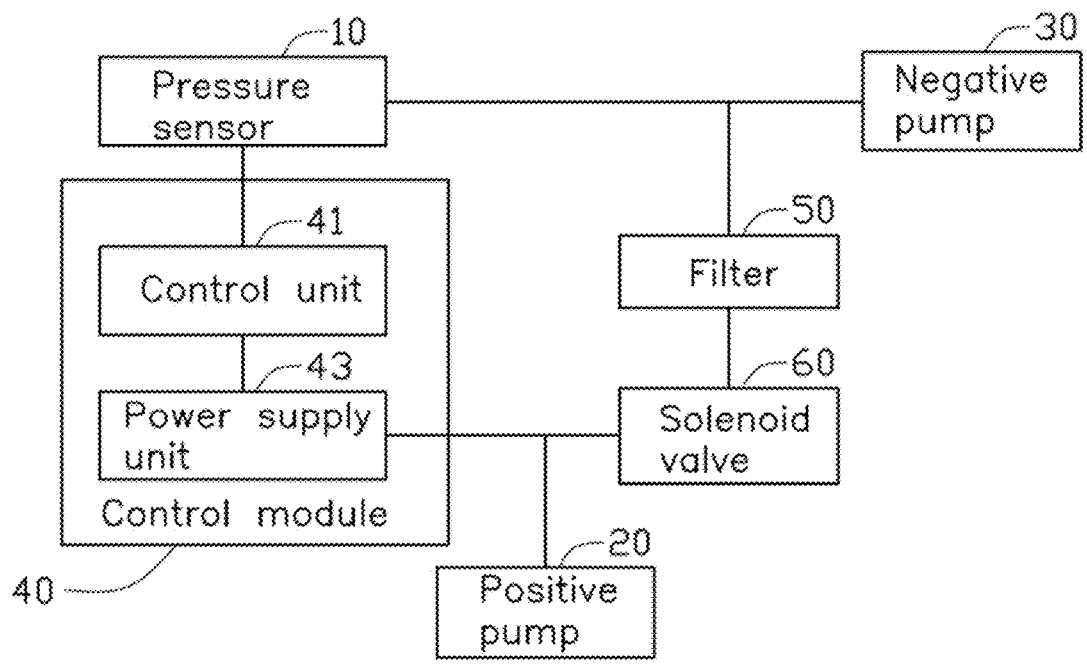
FIG. 1 is a block diagram of one exemplary embodiment of a medicine powder cleaning apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a cleaning apparatus for cleaning and unblocking compacted medicine powder in an automatic picking-medicine system.

FIG. 1 illustrates an exemplary embodiment of a medicine powder cleaning apparatus. The medicine powder cleaning apparatus comprises a pressure sensor 10, a positive pump 20, a negative pump 30, a control module 40, a filter 50, and a solenoid valve 60. The control module 40 comprises a control unit 41 and a power supply unit 43. The pressure sensor 10 connects electrically to the control unit 41. The control unit 41 connects electrically to the power supply unit 43. The power supply unit 43 connects electrically to the positive pump 20 and the solenoid valve 60. The control unit 41 is configured to control the power supply unit 43 to determine whether power should be supplied to the positive pump 20 and the solenoid valve 60.

Figure 2:
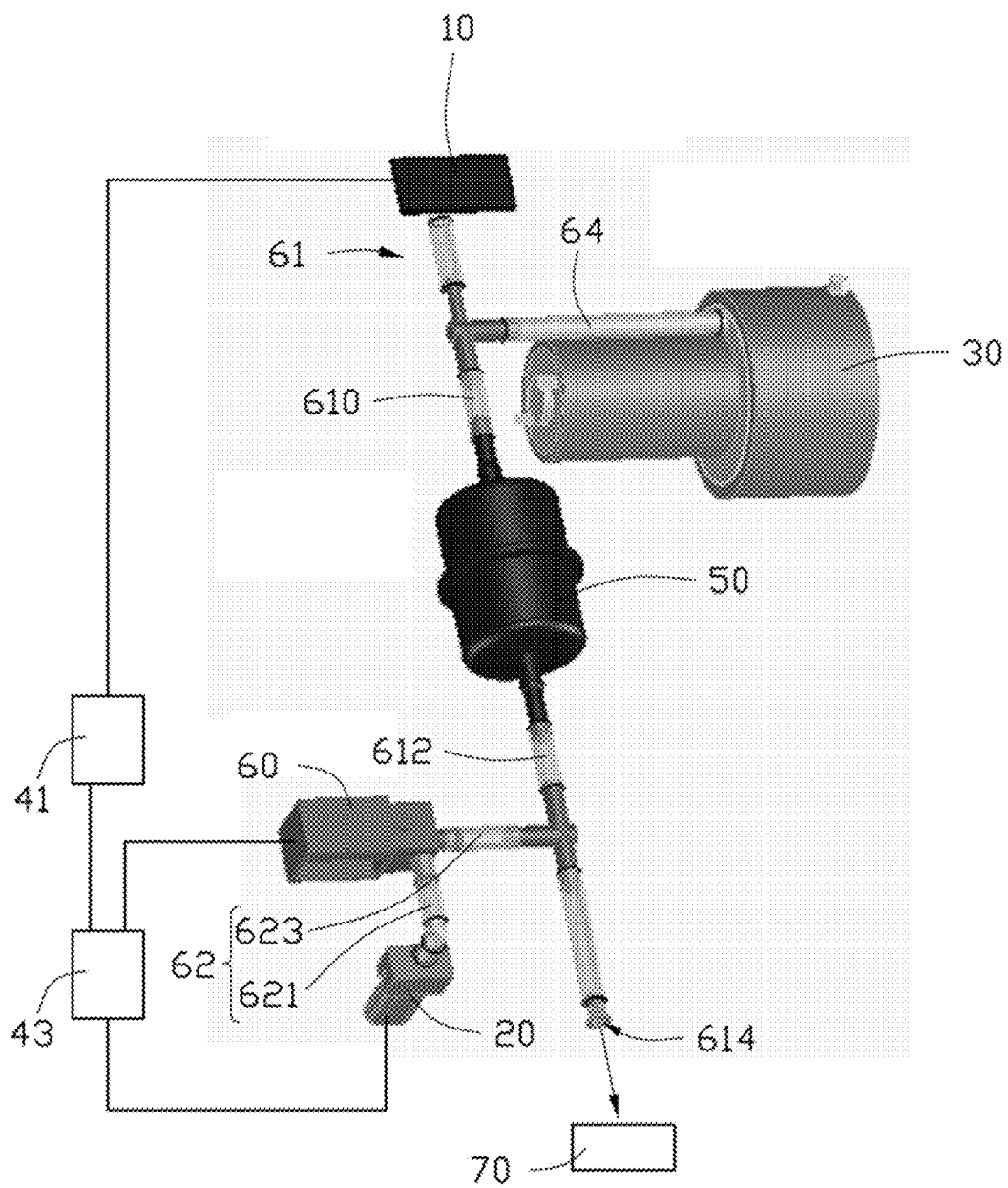
FIG. 2 is a diagrammatic view of the medicine powder cleaning apparatus of FIG. 1.
Figure 3:
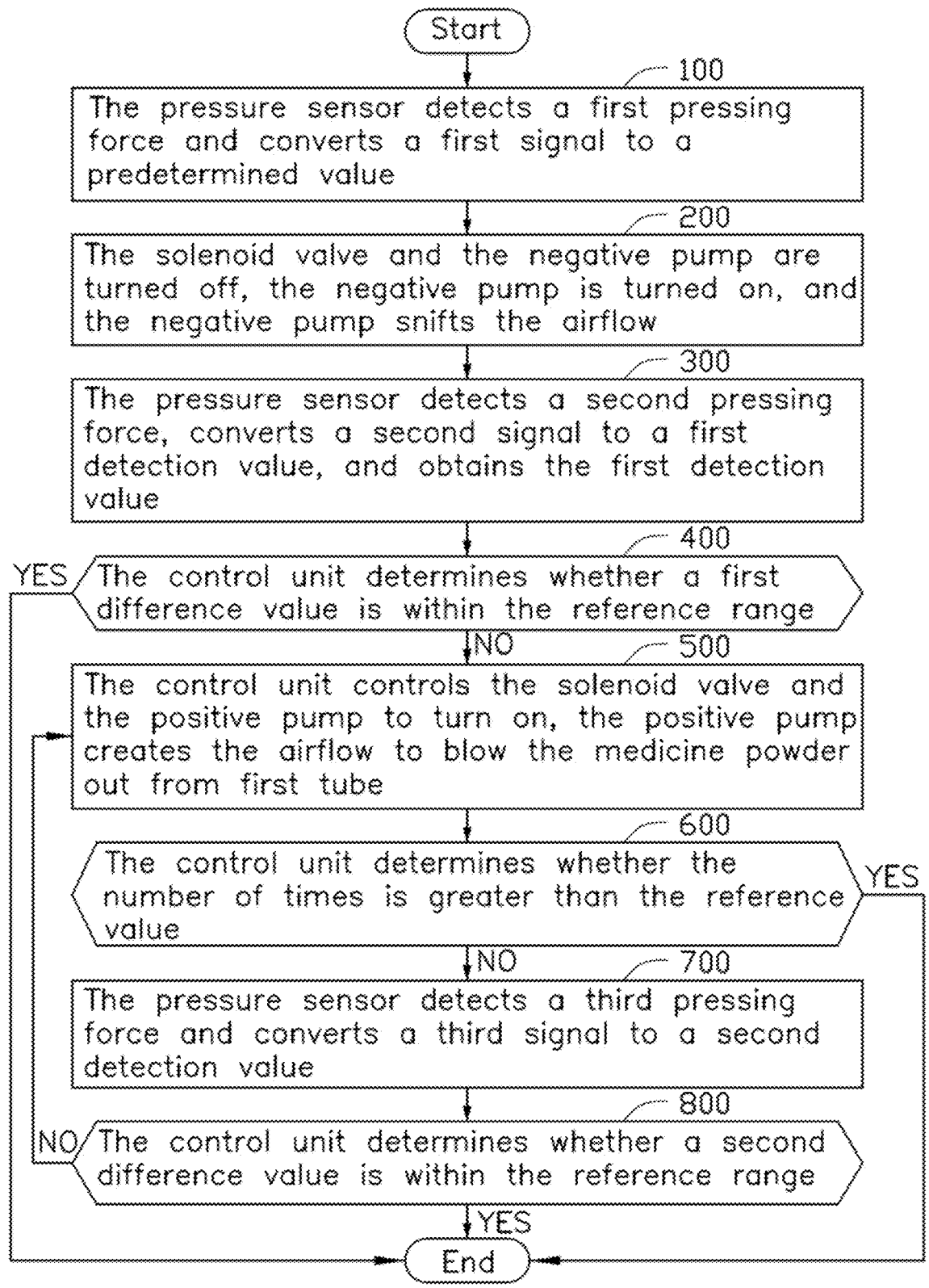
FIG. 3 is a flowchart of one exemplary embodiment of a medicine powder cleaning method.
Figure 4:
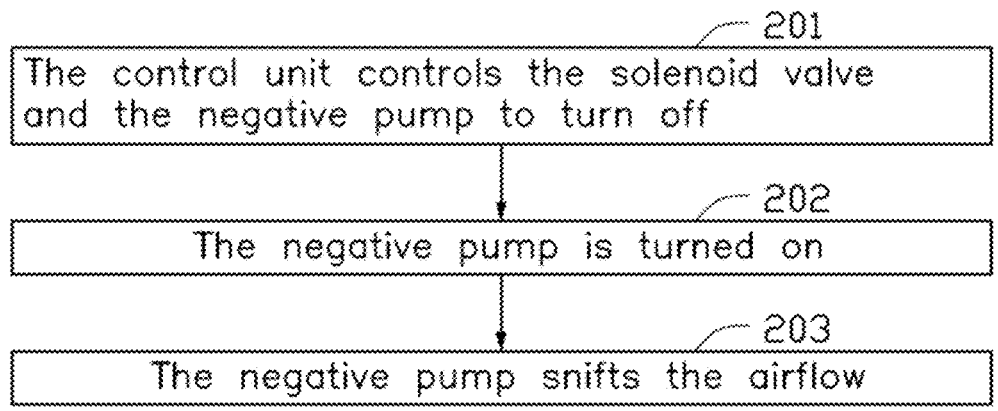
FIG. 4 is a flowchart of a picking block of the medicine powder cleaning method of FIG. 3.

FIG. 2 illustrates that the pressure sensor 10 is coupled to one terminal of a first connecting portion 610 of a first tube 61. The other terminal of the first connecting portion 610 of the first tube 61 is coupled to one terminal of the filter 50. The other terminal of the filter 50 is coupled to one terminal of a second connecting portion 612 of the first tube 61. The other terminal of the second connecting portion 612 of the first tube 61 defines an opening 614. The opening 614 is configured to couple to an outputting device 70. The outputting device 70 is configured to output the medicine powder.

The positive pump 20 is coupled to one terminal of the solenoid valve 60 through a first portion 621 of a second tube 62. The other terminal of the solenoid valve 60 is coupled to the second connecting portion 612 of the first tube 61 through a second portion 623 of the second tube 62. The first portion 621 of the second tube 62 extends through the second portion 623 of the second tube 62. The second portion 623 of the second tube 62 extends through the second connecting portion 612 of the first tube 61. The negative pump 30 is coupled to the first connecting portion 610 of the first tube 61 through a third tube 64. The third tube 64 extends through the first connecting portion 610 of the first tube 61.

The filter 50 is configured to filter the medicine powder of the first tube 61 to avoid the third tube 64 being choked by the medicine powder.

When the positive pump 20 and the solenoid valve 60 are in a starting state, the control unit 41 prevents the power supply unit 43 supplying power to the positive pump 20 and the solenoid valve 60. The positive pump 20 and the solenoid valve 60 are thus in a non-working state to not work, the solenoid valve 60 cannot control the airflow in the second tube 62. The pressure sensor 10 is configured to detect a first pressing force in the first tube 61 before picking medicine. The pressure sensor 10 is also configured to convert the first pressing force to a first signal and convert the first signal to a predetermined value. The pressure sensor 10 is further configured to obtain the predetermined value. Picking medicine begins after the pressure sensor 10 obtains the predetermined value. In detail, when the negative pump 30 is turned on to be in a working state, picking medicine begins. The negative pump 30 is turned off to be in a non-working state after medicine is picked finished. After picking medicine is finished, the pressure sensor 10 is configured to detect a second pressing force in the first tube 61, convert the second pressing force to a second signal, convert the second signal to a first detection value, and the first detection value is obtained. The control unit 41 is configured to obtain the predetermined value and the first detection value from the pressure sensor 10, and to store the predetermined value and the first detection value. A difference value between the predetermined value and the first detection value is obtained, and a determination is made as to whether the first difference value is within a reference range. A first cleaning process begins when the control unit 41 determines that the first difference value is not within the reference range. In one exemplary embodiment, the reference range is from 0 to 150.

In detail, the first cleaning process operates as follows: the control unit 41 controls the positive pump 20 and the solenoid valve 60 turn on. Further, the control unit 41 controls the power supply unit 43 to supply power to the positive pump 20 and the solenoid valve 60, the positive pump 20 and the solenoid valve 60 thus being in a working state, the solenoid valve 60 opens the second tube 62 to allow an airflow in the second tube 62, and the positive pump 20 creates the airflow to blow the medicine powder out to the outputting device 70 from the opening 614 of the first tube 61.

After the first cleaning process is finished, the control unit 41 is further configured to count the number of times of the positive pump 20 and the solenoid valve 60 are turned on. When the control unit 41 determines the times is greater than a reference value, the pressure sensor 10 detects a third pressing force in the first tube 61, converts the third pressing force to a third signal, converts the third signal to a second detection value, and the second detection value is obtained. The control unit 41 is configured to obtain the second detection value from the pressure sensor 10, to store the second detection value, to obtain a second difference value between the predetermined value and the second detection value, and to determine whether the second difference value is within a reference range. A second cleaning process begins when the control unit 41 determines that the second difference value is not within the reference range. In one exemplary embodiment, the reference value is 2.

When the power supply unit 43 supplies power to the positive pump 20 and the solenoid valve 60, the positive pump 20 and the solenoid valve 60 are in the working state. The solenoid valve 60 thus opens the second tube 62, thereby enabling the positive pump 20 to create the airflow to blow the medicine powder out to the outputting device 70 from the opening 614 of the first trachea 61.

FIGS. 3-5 illustrate a flowchart of a method in accordance with an example embodiment. A medicine powder cleaning method is provided by way of example, as there are a variety of ways to carry out the method. The medicine powder cleaning method described below can be carried out using the configurations illustrated in FIGS. 1-2, for example, and various elements of these figures are referenced in explaining medicine powder cleaning method. The illustrated order of blocks is by example only and the order of the blocks can change. Additional blocks may be added or fewer blocks may be utilized without departing from this disclosure. The medicine powder cleaning method can begin at block 100.

At block 100, the pressure sensor 10 detects a first pressing force in the first tube 61, converts the first pressing force to a first signal, converts the first signal to a predetermined value, and obtains the predetermined value.

At block 200, the solenoid valve 60 and the negative pump 30 are turned off the negative pump 30 is turned on, and the negative pump 30 shifts the airflow and picks medicine.

At block 300, the pressure sensor 10 detects a second pressing force in the first tube 61, converts a second signal corresponding to the second pressing force to a first detection value, and obtains the first detection value.

At block 400, the control unit 41 obtains the predetermined value and the first detection value from the pressure sensor 10, obtains a first difference value between the predetermined value and the first detection value, and determines whether the first difference value is within the reference range. If yes, the method goes to the end; if no, the method goes to block 500.

At block 500, the control unit 41 controls the solenoid valve 60 and the positive pump 20 to turn on, thereby enabling the positive pump 20 to create the airflow to blow the medicine powder out from first tube 61.

At block 600, the control unit 41 counts the number of times the solenoid valve 60 and the positive pump 20 are continuously turned on, determines whether the times is greater than the reference value. If yes, the method goes to block 700; if no, the method goes to the end.

At block 700, the pressure sensor 10 detects a third pressing force in the first tube 61, converts a third signal corresponding to the third pressing force to a second detection value, and obtains the second detection value.

At block 800, the control unit 41 obtains the second detection value from the pressure sensor 10, obtains a second difference value between the predetermined value and the second detection value, and determines whether the second difference value is within the reference range. If yes, the method goes to the end; if no, the method goes to block 500.

FIG. 4 illustrates a flowchart of a picking block 200 of the medicine powder cleaning method of FIG. 3. The picking block 200 can begin at block 201.

At block 201, the control unit 41 controls the solenoid valve 60 and the negative pump 30 to turn off. In detail, the control unit 41 controls the power supply unit 43 to not supply power to the positive pump 20 and the solenoid valve 60.

At block 202, the negative pump 30 is turned on.

At block 203, the negative pump 30 shifts the airflow and picks medicine.

FIG. 5 illustrates a flowchart of a cleaning block 500 of the medicine powder cleaning method of FIG. 3. The picking block 500 can begin at block 501.

At block 501, the negative pump 30 is turned off, the control unit 41 controls the positive pump 20 and the solenoid valve 60 to turn on. In detail, the control unit 41 controls the power supply unit 43 to supply power to the positive pump 20 and the solenoid valve 60.

At block 502, the solenoid valve 60 controls the airflow in the second tube 62 to flow.

At block 503, the positive pump 20 creates the airflow to blow the medicine powder out to the outputting device 70 from the opening 614 of the first tube 61.

In the exemplary embodiment, the pressure sensor 10 is configured to detect gas pressure in the first tube 61. The control unit 41 determines whether medicine powder is in the tube through determining whether a difference value between the predetermined value the detection value is within a reference range, thereby controlling to turn on the positive pump 20 and the solenoid valve 60 to clean the tube, thus avoiding the third tube 64 being choked by the medicine powder.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A medicine powder cleaning method comprising:

detecting a first pressing force in a first tube to obtain a first detection value by a pressure sensor;

obtaining a first difference value between a predetermined value and the first detection value by a control unit, determining whether the first difference value is within a reference range by the control unit;

controlling a power supply unit to supply power to a positive pump by the control unit when the first difference value is not within the reference range;

creating the airflow to blow the medicine powder out by the positive pump after the positive pump being supplied power by a power supply unit; and wherein the control unit counts a number of times that a solenoid valve and the positive pump are continuously turned on and determines whether the number is greater than a reference number after the positive pump creates the airflow to blow the medicine powder out from the first tube.

2. The medicine powder cleaning method of claim 1, further comprising a step of detecting a second pressing force in the first tube to obtain the predetermined value by the pressure sensor before detecting the first pressing force.

3. The medicine powder cleaning method of claim 1, further comprising a step of detecting a third pressing force in the first tube to obtain a second detection value by the pressure sensor after spraying the airflow to blow out the medicine powder by the positive pump.

4. The medicine powder cleaning method of claim 3, further comprising a step of obtaining a second difference value between the predetermined value and the second detection value by the control unit.

5. The medicine powder cleaning method of claim 4, further comprising a step of determining whether the second difference value is within the reference range after obtaining the second difference value by the control unit.

6. The medicine powder cleaning method of claim 5, further comprising a step of controlling the power supply unit to supply power to the positive pump by the control unit when the first difference value is not within the reference range.

* * * * *